Jan. 6, 1970   J. G. SCHNEEMAN   3,488,496
X-RAY FILM TRANSPORT DEVICE HAVING MEANS FOR CONTROLLING
THE DESIRED LENGTH OF FILM FRAME
Filed Dec. 27, 1966   6 Sheets-Sheet 1
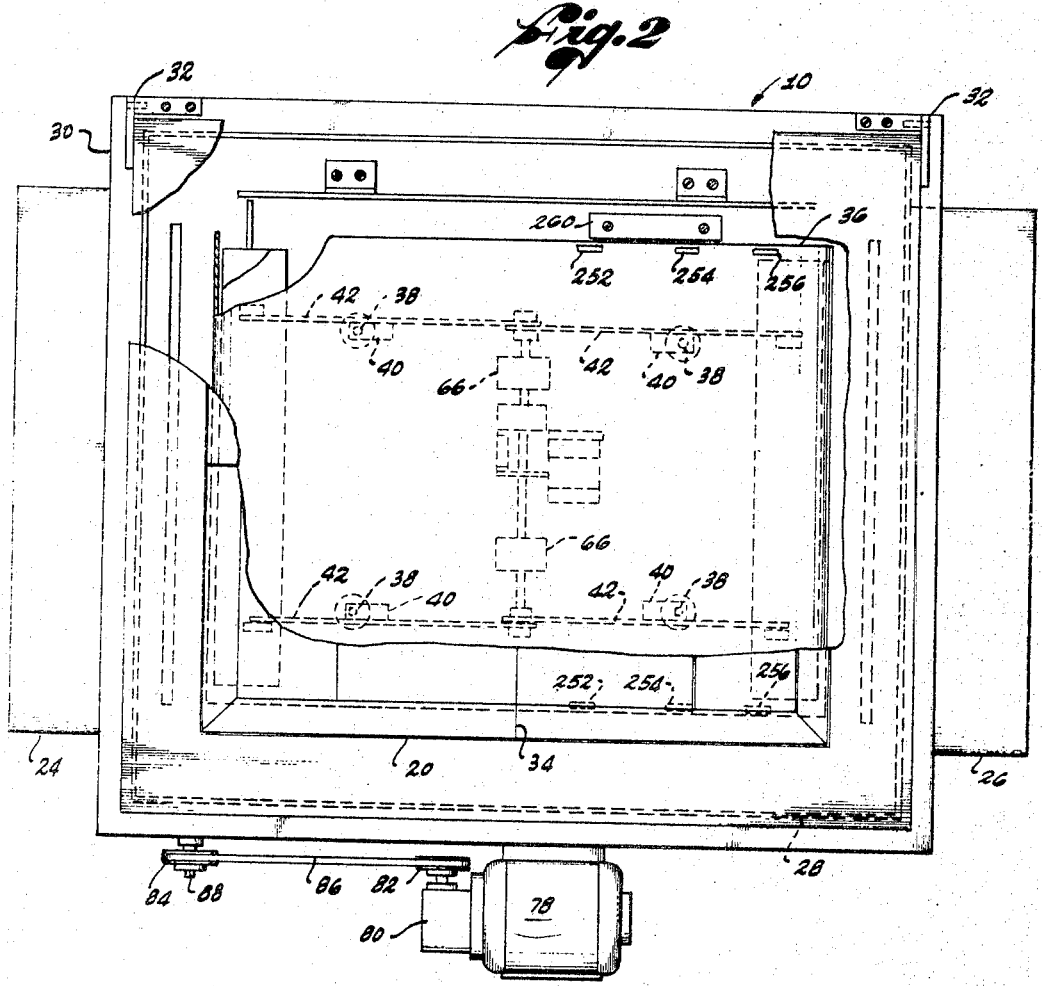
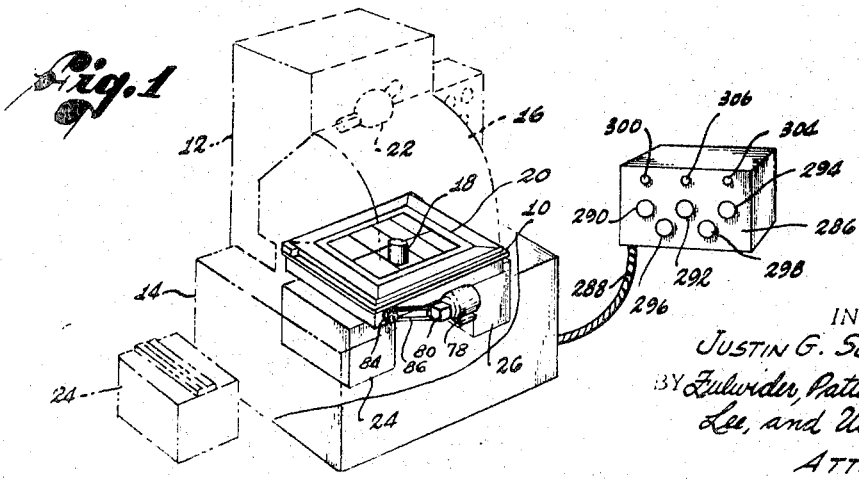
INVENTOR.
JUSTIN G. SCHNEEMAN
BY Zulwider, Patton, Rieber,
Lee, and Utecht
ATTORNEYS Jan. 6, 1970  J. G. SCHNEEMAN  3,488,496
X-RAY FILM TRANSPORT DEVICE HAVING MEANS FOR CONTROLLING
THE DESIRED LENGTH OF FILM FRAME
Filed Dec. 27, 1966  6 Sheets-Sheet 2

INVENTOR.
JUSTIN G. SCHNEEMAN
BY Fulwider Patton, Rieber,
Lee, and Utecht
ATTORNEYS Jan. 6, 1970   J. G. SCHNEEMAN   3,488,496
X-RAY FILM TRANSPORT DEVICE HAVING MEANS FOR CONTROLLING
THE DESIRED LENGTH OF FILM FRAME
Filed Dec. 27, 1966   6 Sheets-Sheet 3
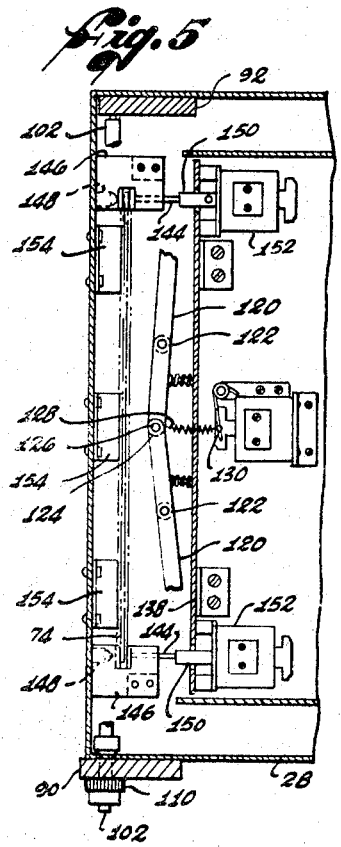
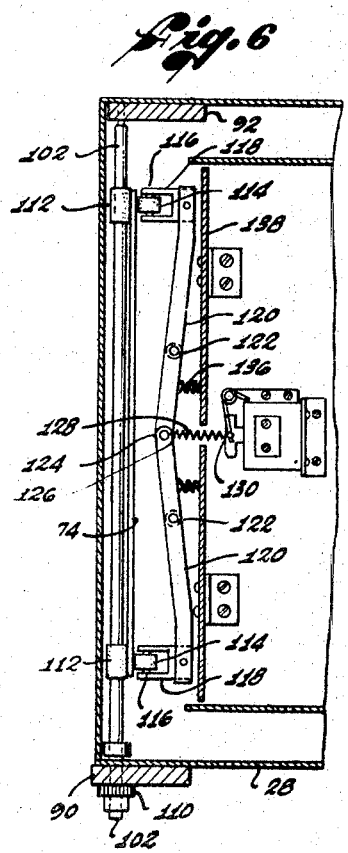
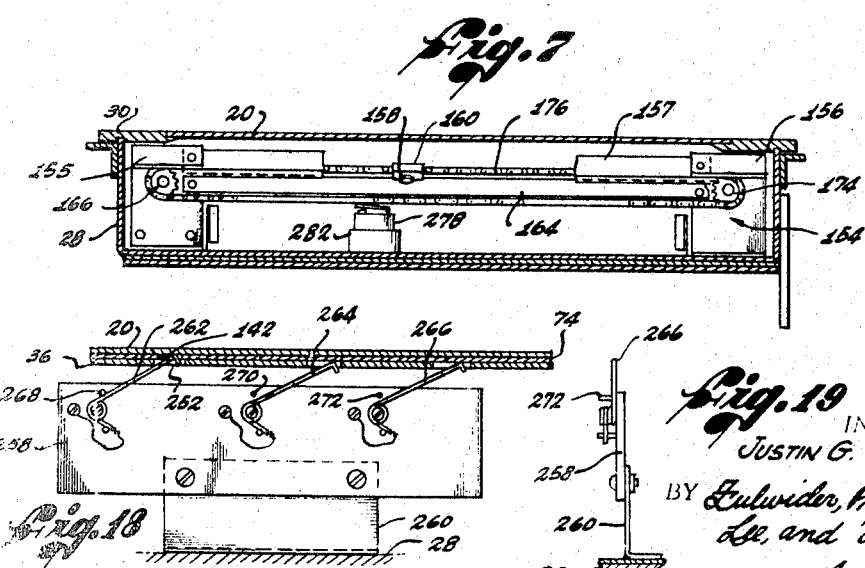
INVENTOR.
JUSTIN G. SCHNEEMAN
ATTORNEYS

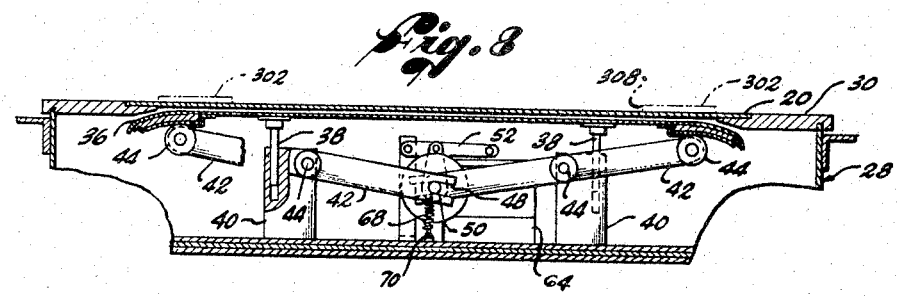
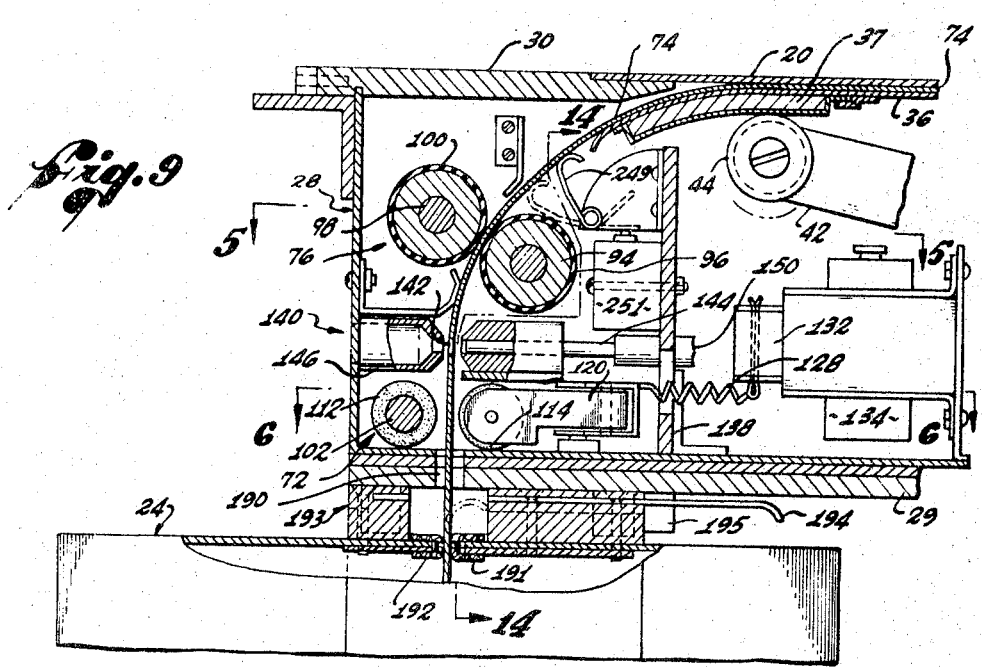
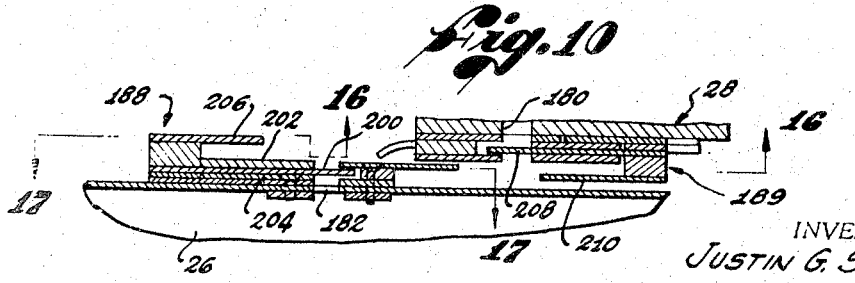

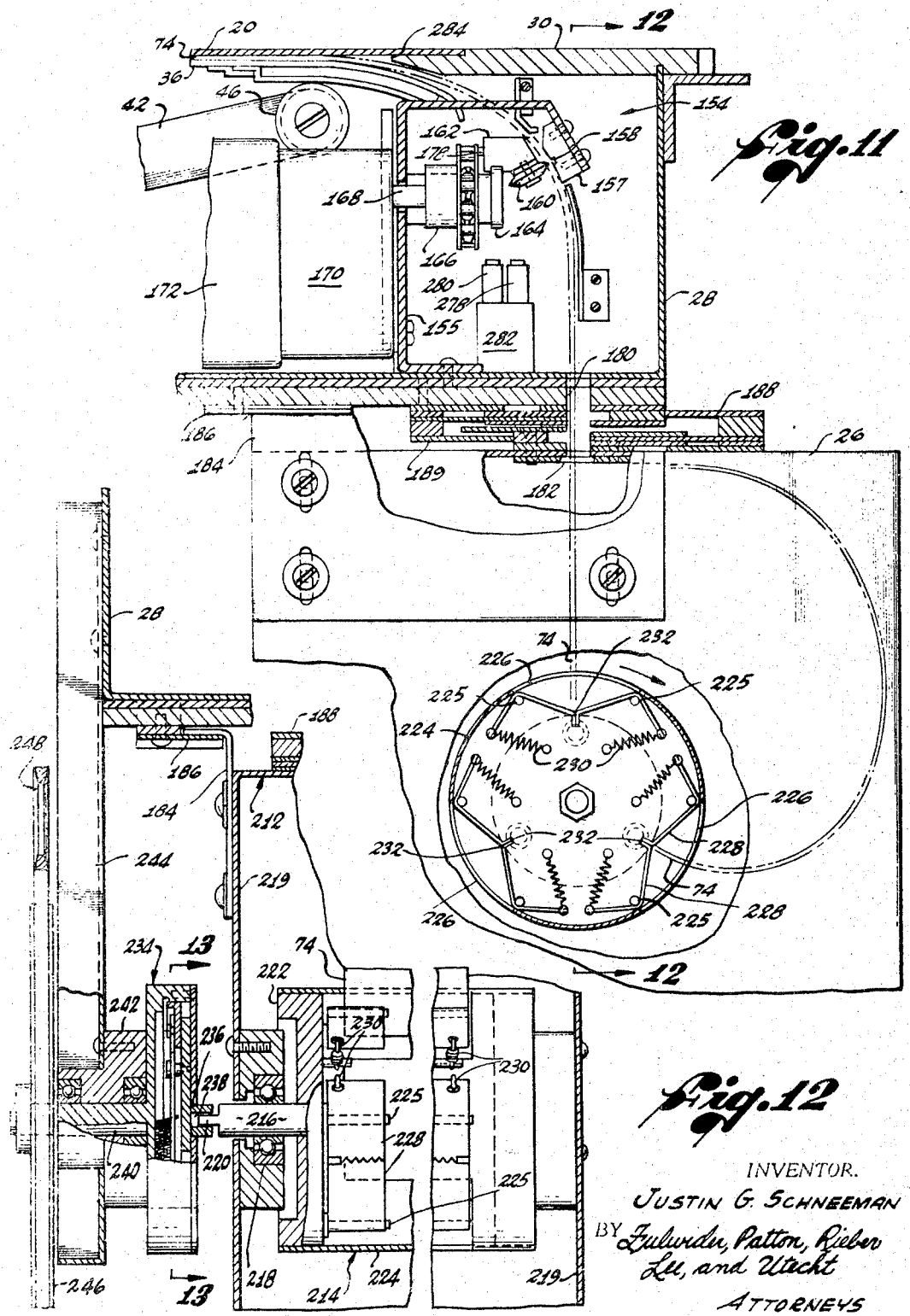

INVENTOR.
JUSTIN G. SCHNEEMAN
BY Fulwider, Patton, Rieber
Lee, and Utecht
ATTORNEYS

United States Patent Office 3,488,496
Patented Jan. 6, 1970

3,488,496
X-RAY FILM TRANSPORT DEVICE HAVING MEANS FOR CONTROLLING THE DESIRED LENGTH OF FILM FRAME
Justin G. Schneeman, 11001 Wrightwood Lane, Studio City, Calif. 91604
Filed Dec. 27, 1966, Ser. No. 605,022
Int. Cl. G01n 23/04; H01j 37/22; H05g 1/62
U.S. Cl. 250—66                                   18 Claims

ABSTRACT OF THE DISCLOSURE

An automatic X-ray roll film transport having detachable film supply and takeup cassettes at opposite ends of a transport mechanism, the transport including self-threading means, automatic means for advancing different preselected lengths of film onto a platen, and an optionally actuatable cutter to sever exposed film from the roll.

---

This invention relates to the radiographic art and, more particularly, to an automatic apparatus for handling X-ray roll film in making serial exposures on the film.

While not so limited, the apparatus of my invention is of particular utility in industrial radiography, which requires the quick and efficient inspection of a great many parts in a short period of time. In the industrial X-ray field it has been customary to use pieces of cut sheet film, the pieces then being placed in light-proof envelopes and then placed under the part to be X-rayed. This common use of cut film presents problems in requiring maintenance of a large stock of cut film, the pieces of film are frequently accidentally light-struck, and repeat exposures cannot be made of the same part without disturbing the part position in order to place a new unexposed piece of film in a holder under the part. Further, image intensifying screens, when required, must be put into the light-proof envelope along with the film and, frequently, a piece of film is much larger than required for the object to be X-rayed, leading to film waste.

The apparatus of my invention handles X-ray roll film in a manner to successfully obviate the foregoing disadvantages. A cassette containing a supply of unexposed film and which is light-tight need only have a short length of leader extending out of the cassette. When the supply cassette is attached to the transport device, a threading mechanism secures a purchase on the leader and automatically advances the film a predetermined distance onto a feed roll mechanism. From this starting position, different lengths of film, as selected by the operator in accordance with the size of the object to be X-rayed, are advanced onto a platen that is opposite an X-ray window. The window assembly is hinged so that, if it is desired to use image intensifying screens, access can be had to the platen to supply a screen to it while the other screen is supplied to the underside of the X-ray window.

Each cycle of advancement of the film involves the punching of a pair of indexing perforations on opposite edges of the film in advance of a platen, actuation of feed rollers to push a length of film onto the platen, and the interception of the indexing perforations by an active one of a set of sensors spaced longitudinally along the platen and protruding therethrough. The active sensor effects de-activation of the feed rolls and permits the platen to bias the film firmly and flat against the X-ray window. After exposure, the film is again cyclicly advanced by the feed rolls for the same or a different lentgh, at the choice of the operator, and with new indexing perforations having been punched into the new frame of film on the platen. Optionally, the exposed frame is fed onto a take-up reel in a light tight cassette or severed from the roll of film. In the latter case, the newly formed indexing perforation cooperate with different sensors on the platen to effect advancement of the film to a cutting station where the film is automatically stopped. Continuing the cut-off cycle, a cutter wheel carried on an endless chain slices across the film along the edge of the previously exposed frame. After the slicing operation, the carriage for the cutter engages a pair of switching devices, one of which effects stopping of the cutter travel and the other of which effects reverse driving of the feed rollers to now pull the new frame of film back into registration with the X-ray window, the rollers becoming de-activated when the indexing perforations of the new frame of film receive the active one of the sensors.

Other objects and advantages of the invention will be apparent from the ensuing description and the accompanying drawings of a preferred embodiment.

FIGURE 1 is a perspective view of a film transport device or film holder according to the present invention, utilized in conjunction with an industrial radiographic machine;

FIGURE 2 is a plan view of the device, partially broken away to show features of its construction;

FIGURE 3 is a partial cross-section taken along the line 3—3 of FIGURE 4, partially broken away to show certain features of construction;

FIGURE 4 is a side view of the device as seen in the direction 4—4 of FIGURE 3;

FIGURE 5 is a partially broken away cross-section taken generally along the line 5—5 in FIGURE 9, with some parts omitted, in order to show the film marking means;

FIGURE 6 is a cross-section taken along the line 6—6 in FIGURE 9, showing the film threading means;

FIGURE 7 is a cross-sectional view taken along the line 7—7 in FIGURE 3, showing the film severing means;

FIGURE 8 is a cross-section taken along the line 8—8 in FIGURE 3, showing the platen actuating means;

FIGURE 9 is an enlarged partly cross-sectional and partly elevational view along the line 9—9 in FIGURE 3, showing the film supply, threading, marking and feeding means;

FIGURE 10 is a cross-sectional view of the light tight closure of the film take-up cassette and of the light tight closure for the film exit slot in the transport housing, the cassette having just been detached;

FIGURE 11 is an enlarged cross-sectional view of the exposed film severing and receiving means;

FIGURE 12 is a transverse cross-section taken along the line 12—12 of FIGURE 11, showing the exposed film receiving means and its driving mechanism;

FIGURE 18 is an elevational view of the film travel contact board taken along the line 18—18 of FIGURE 3; and FIGURE 19 is an end view of the film travel contact board of FIGURE 18.

Figure 14:
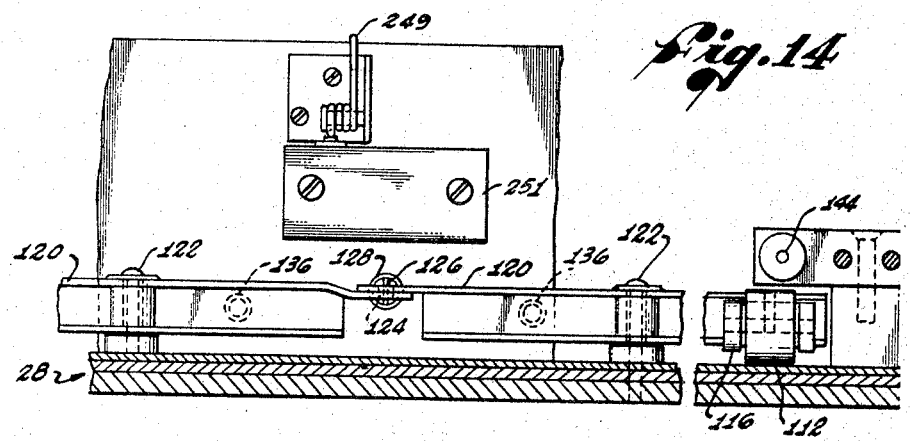
FIGURE 14 is an enlarged sectional view, taken generally along the line 14—14 of FIGURE 9, to show the arrangement of the film marking punches and the movable threading rolls.

Referring to FIGURE 1, the film transport device 10, or film holder, is shown installed in an industrial radiographic inspection machine 12, indicated by dashed lines. The film holder 10 is placed in the table 14 of the machine 12, under a safety hood 16, and the article 18 to be radiographed is placed on the window 20 of the film holder, beneath the X-ray tube 22. Film is supplied to the film holder 10 from a light-tight detachable cassette or magazine 24, suspended beneath one end of the holder. When the radiograph is to be taken, the safety hood 16 is lowered, the exposure is made, and the exposed film is passed into a light-tight detachable take-up canister 26, suspended at the delivery end of the film holder 10. The X-ray machine 12 is merely one example of the many types of radiographic apparatus with which the invention can be used.

Referring to FIGURES 2, 3 and 4, the film holder 10 will be seen to have a rectangular, box-like housing 28 on be seen to have a rectangular, box-like housing 28 on a lead line base plate 29 and having a brass-framed cover 30 which can be swung upwardly upon hinges 32. The cover 30 contains the X-ray transparent, but visibly opaque, window 20, upon which is scribed a reference grid 34 indicating the radiographic field within which the articles to be X-rayed are placed. Beneath the window 20, a platen 36, best seen in FIGURE 8, is positioned for limited vertical movement, supported by guide rods 38 secured to the underside of the platen and reciprocable within support blocks 40 affixed to the bottom of the frame 28. The opposite ends of the platen 36 are curved on a radius compatible with the turn of the film over these ends and on the underside of the platen lead sheet strips 37, adjacent opposite ends of the window 20, may be secured.

Figure 15:
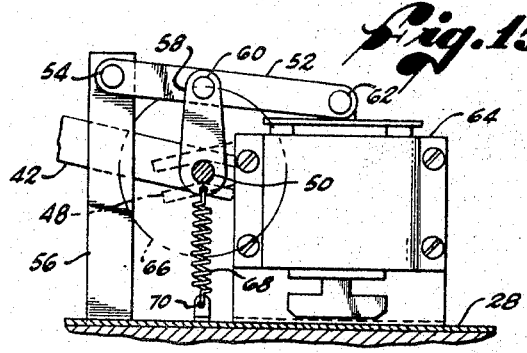
FIGURE 15 is an enlarged view in elevation of the platen actuating solenoid and lever system, taken along the line 15—15 of FIGURE 3.
Figure 16:
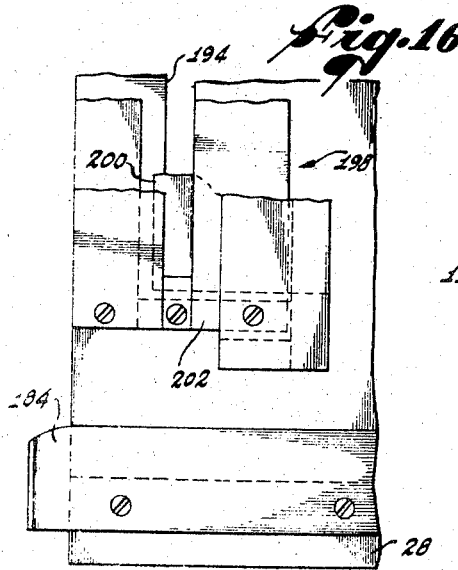
FIGURE 16 is an enlarged, partially broken away view of the closure for the film exit slot of the transport housing, taken generally along the line 16—16 of FIGURE 10.
Figure 17:
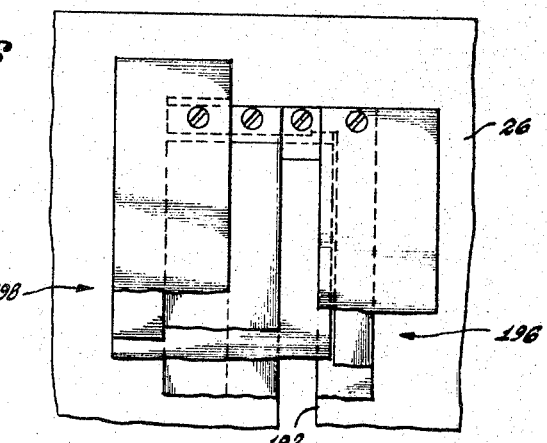
FIGURE 17 is an enlarged partially broken away view of the closure for the exposed film containers, taken generally along the line 17—17 of FIGURE 10.

The platen 36 is raised and lowered beneath the window 20 by means of levers 42, each pivoted at 44 to one of the support blocks 40 and carrying at its outer end a roller 46, which bears against the underside of the platen. The inner end of each lever 42 bears a slot 48 to receive an actuating rod 50. As best shown in FIGURE 15, a lever 52 is pivoted at 54 to a stationary bracket 56, secured to the bottom of the frame 28. The lever 52 is connected to the upper end of a link 58 by a pivot 60, the lower end of the link 58 being connected to the actuating rod 50.

The free end of the lever 52 is connected by pivot 62 to a solenoid 64, which is affixed to the bottom of the frame 28. The platen 36 is counterbalanced by means of counterweights 66 located upon the actuating rod 50. A tension spring 68, attached at its upper end to the link 58 and at its lower end to an anchor 70 affixed to the frame 28, biases the platen upwardly. Thus, when the solenoid 64 is energized, it raises the lever 52, lifting the actuating rod 50 by means of the link 58, which raises the inner ends of the levers 42 and lowers the platen 36. With the platen 36 counterbalanced and biased as shown, if the outer ends of the levers 42 are positively connected to the platen instead of supporting it by means of the rollers 46, the film holder 10 can be used at any attitude as well as the horizontal and near-horizontal. The arrangement shown, however, permits ready access to the interior mechanism of the device by merely lifting the platen 38 off the rollers 46.

Referring to the cross-sectional view in FIGURE 9, the film holder 10 includes mechanism, generally indicated at 72, for threading the film 74 into the holder from the magazine 24, and mechanism, generally indicated at 76, for advancing the film through the holder after it is threaded. Referring now to FIGURES 3 and 4, the film advancing mechanism 76 is driven by a motor 78 through reduction gearing 80, a driving pulley 82, a driven pulley 84, and a transmission belt 86. The driven pulley 84 is mounted upon the end of a drive shaft 88 which is journaled in bearing plates 90 and 92, mounted upon the frame 28. The driving shaft 88 has mounted upon it several drive rollers 94 which are keyed to it and carried about their peripheries bands 96 made of cork, an elastomer, or other suitable friction material for gripping the film 74. An idler shaft 98 is journaled in the bearing plates 92, parallel to the shaft 88, and has mounted upon it several idler rollers 100, each opposite one of the driver rollers 94 and rotatable in close proximity to it, so that the film 74 may be gripped between the rollers, as shown in FIGURE 9.

The film threading mechanism 72, as seen in FIGURE 9, includes a shaft 102, parallel to the shafts 88 and 98 and also journaled in the bearing plates 90 and 92. Adjacent to the pulley 84, the drive shaft 88 has keyed to it a driving gear 104, which meshes with a first idler gear 106, rotatably mounted upon the bearing plate 90 and meshing with a second idler gear 108, similarly mounted. In turn, a driven gear 110, keyed to the shaft 102, meshes with and is rotated by the idler gear 108.

Referring to FIGURES 3, 6 and 9, a pair of film threading rollers 112, made of or faced with an elastomer, cork, or other suitable friction material, is mounted upon the shaft 102, one near each end of the shaft, approximately in line with the side edges of the platen 36 as it appears in FIGURE 3. The rollers 112 are affixed to the shaft 102 and are driven with it. As seen in FIGURE 6, an idler roller 114, mounted for rotation upon a shaft 116 held within a fork 118, is positioned in proximity to each of the film threading rollers 112, with its rotational axis parallel to the shaft 102. Each fork 118 is secured to the outer end of one of a pair of levers 120, which are swingably mounted on pivots 122 affixed to the bottom of the frame 28, as seen in FIGURE 14. The levers 120 are preferably made of channel cross-section, and their inner ends overlap and are pierced by apertures 124 which are aligned. The terminal 126 of a tension spring 128 is hooked through the aperture 124, pinning the ends of the levers together. The other terminal 130 of the spring 128 is attached to the core 132 of a solenoid 134. The levers 120 are biased by means of compression springs 136, interposed, as shown in FIGURES 6 and 14, between the levers 120 and a transverse inner wall 138 of the frame 28. Thus, idler rollers 114 are held away from the threading rollers 112 by the compression springs 136. As viewed in FIGURE 6, when the solenoid 134 is energized, its core 132 pulls upon the tension spring 128, which pulls upon the levers 120, causing the idler rollers 114 to move toward the threading rollers 112, pressing the film 74 into driving contact with them and threading it into the film advancing mechanism 76.

In FIGURE 9, the means for placing reference marks upon the film is generally indicated at 140, and comprises, in the embodiment shown, means for punching a reference hole 142 simultaneously in each side of the film, so that the two reference holes lie directly opposite each other across the width of the film. The film marking means 140 consists of a pair of punches 144, each reciprocable within one leg of a guide 146 which, as seen in FIGURE 5, is C-shaped and receives the edge of the film 74. The opposite leg of each C-shaped guide 146 carries a die 148 which is coaxial with its corresponding punch 144. Each punch 144 is attached to the core 150 of a solenoid 152 which, when energized, causes a punch 144 to mark the film by cutting a reference hole 142 about ⅛ inch in diameter. When not activated, each punch 144 is held retracted from the film by the customary retracting spring (not shown) of its solenoid 152.

The film 74, driven by the rollers 94 and 100, passes between the window 20 and the platen 36, and then passes to the cutting mechanism, generally indicated at 154 in FIGURE 11. The cutting mechanism 154 comprises supports 155 and 156 which are affixed to the frame 28 and support the ends of a cutting bar 157. The cutting bar 157 extends across the width of the film and is provided with a lengthwise cutting groove 158 facing the upper side of the film. A cutting wheel or blade 160 is mounted upon a carriage 162 which engages and is guided by a track 164, positioned parallel to the cutting bar 157, so that the sharpened edge of the cutting wheel is presented to the underside of the film and enters the groove 158 to a depth slightly greater than the thickness of the film. At one end of the track 164, as viewed in FIGURE 7, a drive sprocket 166, is keyed to the output shaft 168 of reduction gearing 170 which is mounted on support 155 and driven by a motor 172. At the opposite end of the track 164, an idler sprocket 174 is rotatably mounted on support 156. A continuous drive chain 176 passes about the sprockets 166 and 174, and a carriage 162 is attached to the chain 176 by means of a pin 178. When the motor 172 is energized, the chain pulls the carriage along the upper side of the track 164, causing the cutting wheel 160 to traverse the groove 158 of the cutting bar and to sever the film. After the film is severed, the chain pulls the carriage around the end of the track to its lower side, where the carriage comes to rest when the motor is de-energized. After leaving the cutting mechanism, the film passes downwardly into the take-up canister 26, through a slot 180 in the bottom of the frame 28, and a slot 182 in the top of the canister.

The film supply canister 24 is detachably connected to the input end of the film transport device by any convenient means, for example, a pair of toggle latches. This end of the housing 28 is provided with a film entrance slot 190 and, as is shown in FIGURE 9, the canister 24 is formed with a slot 191 adapted to be held in registration with the housing slot 190 when the canister is mounted in place. The slot 191 of the canister 24 is continuously edged with a velvet light seal strip 192 through which a leader of the film initially extends. A framework, designated generally at 193, may be affixed to the upper wall of the canister 24, surrounding the film exit slot 191, that is adapted to serve as a light baffle with the underside of the housing 28 when the canister 24 is in place. If desired, this framework may be provided with a slide gate 194 which can be opened and closed to uncover and cover the canister slot 191 when the canister 24 is detached from the film holder 28. Thus, the slot 191 of the canister may be closed as the canister is being carried for connection to the housing 28 but with a short leader of the film protruding from the canister in a protected position. Just before the canister 24 is attached, the gate 194 may be opened and an additional length of the leader withdrawn for insertion into the slot 190 and threading mechanism 72 of the film transport housing 28. Suitable indexing blocks 195 are affixed to the underside of the housing 28 for mounting the canister 24 with its slot 191 in the proper registration with the slot 190 of the housing.

The take-up canister 26 is detachable from the film holder 10 and for this purpose, is provided at either end with parallel hangers 184 which slide into parallel ways 186, mounted on the underside of the film holder. When the canister is in place beneath the film holder, the slots 180 and 182 are in registration, as shown in FIGURE 11. In order that the canister 26 may be attached and detached without danger of light striking the film through the slots 180 and 182, a light tight closure 188 on the canister cooperates with a similar closure 189 on the film holder, so that when the canister is slid into place on the hangers 184 the closure 188 and the closure 189 open automatically to permit the film to pass through the slots into the canister. When the canister is removed from the film holder 10, as in FIGURE 10, the closures 188 and 189 automatically close, preventing the film in the film holder and that in the canister from becoming light struck.

The construction and operation of the aforementioned automatic closure are more specifically illustarted in FIGURE 10. The magazine closure 188 which cooperates with the film holder closure 189 includes a sliding panel 200, held between guide panels 202 and 204 and spring biased to the position shown in FIGURE 10, in which it occludes slot 182. Affixed to the panel 200 and offset from it is an actuating projection 206. When the magazine 26 is slipped into place beneath the film holder 10, as shown in FIGURE 11, the actuating projection 206 bears against the closure 189 on the film holder 10, thus retracting the sliding panel 200 and uncovering slot 182, as the magazine slides into place.

The closure 189 on the film holder 10 is similar to the magazine closure 188 and is provided with a similar spring-biased sliding panel 208 which occludes film slot 180. An actuating projection 210 is affixed to the sliding panel 208, and as the magazine is slipped into place, the projection 210 bears against the closure 188, retracting the sliding panel 208 and opening film slot 180. When the magazine is withdrawn from the film holder, closures 188 and 189, being spring biased, automatically cover the film slots 180 and 182.

The film take-up canister 26, as seen in FIGURE 12, consists of a housing 212, containing a reel 214 mounted upon a trunnion shaft 216, which is rotatable in a bearing 218 carried by the end wall 219 of the housing 212. A similar trunnion shaft and bearing (not shown) support the opposite end of the reel 214. The shaft 216 projetcs through the end wall 219 of the housing and has a diametrical drive key 220 milled in its end. The reel 214 has end members 222 inserted in a generally tubular core 224, which has three longitudinal cut-out portions 226 equally spaced about its periphery and extending substantially the length of the core in order to permit entry of the end of the film 74 and its engagement by the reel, as shown in FIGURE 11. Within the core 224, mounted upon pivots 225 affixed to each end member 222, are three sets of serrated grip levers 228, each bent to form an obtuse angle and lightly biased by means of tension springs 230, so that they yield and close in pairs to provide three, spring loaded, film gripping jaws 232, spaced 120 degrees apart at each end of the reel.

Figure 13:
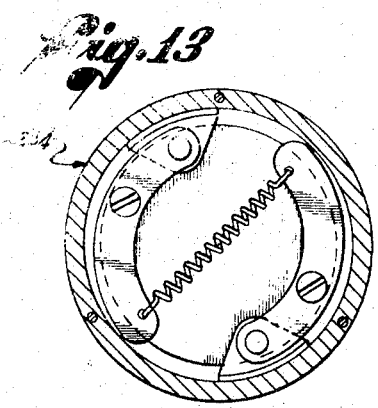
FIGURE 13 is a cross-sectional view of the film receiving means driving clutch, taken along the line 13—13 of FIGURE 12.

The reel 214 is driven through a slip clutch 234, having an output shaft 236 provided with a diametrical slot or keyway 238, which engages the key 220 on the reel shaft 216. The slip clutch 234 is shown in FIGURES 12 and 13 by way of example as being of the two shoe type. The clutch 234 has an input shaft 240 which is rotatably mounted in a bearing assembly 242, supported by a bracket 244 affixed to the frame 28. Referring to FIGURE 3, the clutch input shaft 240 is provided with a pulley 246 which is driven by a belt 248 from a pulley 250 on the shaft 88. The designed speed of rotation of the reel 214 is such that it will take up film without slipping of the clutch 234 when the diameter of the roll of film on the reel is least. As the diameter of the roll increases, the clutch 234 will slip, maintaining tension on the incoming film and compensating for the increasing diameter. Film entering the canister 26, as shown in FIGURE 11, passes downwardly and enters one of the cutout portions 226 in the reel 214, wherein it is gripped at each edge by a set of jaws 232. The reel, which is rotated wherever the film is advanced in the film holder, winds the exposed film, if it has not been severed from the strip, or holds the individual exposed frames if they have been severed.

Referring to FIGURE 9, in the initial operation of the film holder, the film 74 is propelled by the threading mechanism 72 from the magazine 24 into the film advancing mechanism 76, and is driven by the rollers 94 and 100 until it strikes a pivoted lever 249, which actuates an electrical switch 251, de-energizing solenoid 134 and opening the circuit to motor 78, stopping the film so that the film holder is in the "loaded and ready for operation" condition. Upon further operation of the film holder, the film is marked with the reference holes 142 and passes into position for exposure, between the platen 36 and the window 20.

In order to position the film in the window 20, sensing means are provided which sense the reference holes 142 punched in the film. Referring to FIGURE 3, the platen 36 is provided at each side with through slots 252, 254 and 256. Adjacent to the slots, and below the platen at each side, is located a contact board 258, mounted upon a bracket 260 affixed to the frame 28. The contact boards 258, best seen in FIGURES 18 and 19, are provided with spring sensors 262, 264 and 266, which make electrical contact respectively, with contact pins 268, 270 and 272. The sensors 262, 264 and 266 project through the slots 252, 254 and 256, respectively, which are so located that the reference holes 142 in the film 74 pass over them as the film moves between the window 20 and the platen 36. As the reference hole 142 passes over a slot, it allows the sensors 262, 264 or 266 to deflect slightly and to make electrical contact with its respective contact pin, completing an electrical circuit in order to arrest the motion of the film at a desired position, for purposes which will be explained as the description proceeds.

Referring to FIGURES 7 and 11, after an exposed frame is severed from the web of the film by the cutting mechanism 154, the carriage 162 passes along the underside of the track 164 until it strikes and actuates switches 278 and 280, mounted upon a support 282 affixed to the frame 28. The actuation of switch 278 opens the circuit to the motor 172, stopping the cutting mechanism, and the simultaneous actuation of switch 280 causes the film drive motor 78 to move the unsevered strip of film in the reverse direction, until the reference hole 142 reaches an active one of the sensors 262 and 264 which it actuates, de-energizing the motor 78 and stopping the film with its end in registration with the frame edges 308 or 284, respectively, on window 20.

Operation of the film holder 10 is controlled from an electrical control panel, such as panel 286, shown in FIGURE 1, connected by cable 288 to the film holder and the radiographic inspection machine 12. The functioning and modes of operation of the film holder are selected and initiated by means of pushbuttons 290, 292, 294, 296, and 298. Initially, loaded magazine 24, with a short length of film extending from it as a leader, is placed in the film holder 10 and the film leader inserted into the slot 190. The "thread" button 290 is then pressed, which energizes the drive motor 78 and simultaneously energizes solenoid 134, causing the film leader to be gripped by the threading mechanism 72 and fed into the film advancing mechanism 76. When the film strikes the lever 249, switch 251 is actuated, shutting off the motor 78 with the film holder 10 in the "loaded and ready for operation" condition, which is indicated by a signal light 300 on the control panel.

In the exemplification shown, the film holder 10 is capable of exposing either a large frame of film, which, in the usual case of film 14 inches wide, is customarily 17 inches long (frame size 17 inches by 14 inches), or a smaller frame of, typically, 11 inches in length (frame size 11 inches by 14 inches). When the larger size is to be exposed, the window 20 in full size presents the proper frame. When the smaller frame size is to be exposed, an X-ray opaque masking plate 302 is placed at each end of the window 20, as shown in dashed lines in FIGURE 8, in order to blank off a portion of the full frame. Selection of the smaller frame is by the button 292; of the larger, by the button 294.

Assuming that the full frame is to be exposed, button 294 is pressed, energizing the reference marking mechanism 140, causing a reference hole 142 to be punched in each side of the film. Simultaneously, the platen solenoid 64 is energized, lowering the platen, and a conventional time-delay switch (not shown) is activated which, after a brief delay, starts the motor 78 and the film advancing mechanism 76. The film passes between the platen 36 and the window 20 until the reference holes 142 reach and actuate the sensors 264, which stop the film in position for exposure with the frame edge at the edge 284 of the window and de-energize solenoid 64, allowing the platen 36 to rise and to clamp the film. This condition of readiness for exposure is indicated by a signal light 304 on the control panel. It should be noted that when the larger frame is selected, the sensor 262 is inactive, since its function is to stop the film in position for exposure of the smaller frame size.

With the film in position in the window, the exposure is made by pressing button 296, which also extinguishes the signal light 304. After exposure of the film, the operator may elect either to make another exposure of the same size by again pressing button 294, repeating the steps of marking the film, and advancing it into position, or he may elect to sever the exposed frame from the film strip. If he elects to sever the frame, button 298 is pressed, marking the film with new reference holes 142, then advancing it one frame plus the distance along the path of the film from the window edge 284 to the cutting groove 158. At this point, the new reference holes 142 actuate sensors 266, stopping the film and energizing the cutting motor 172. The forward portion of the exposed frame of film will, by this time, have entered the take-up canister 26, and when the exposed frame is severed, it will be pulled into the canister by the action of the reel 214.

After the severing of the exposed frame of film, the carriage 162 continues on around the track 164 until the switches 278 and 280 are actuated, stopping the cutting mechanism and starting the motor 78 in reverse. The film strip is driven backwardly until the reference holes 142 nearest the severed end of the film strip actuate sensors 264, stopping the reverse movement of the film strip with the severed end in registration with the edge 284 of the window 20, and with the film in position for another exposure, as again indicated by the signal light 304.

When it is desired to expose the smaller frame size, as defined by the masking plates 302 placed at the ends of the window 20, the button 292 is pressed, marking the film with reference holes 142 as before and, after a brief delay, advancing the film until the reference holes 142 actuate sensors 262, which stops the film in position for exposure of the shorter frame, as indicated on the control panel by a signal light 306. The sensors 264 for the larger frame size are inactivated when the smaller frame mode of operation has been selected. If it is desired to sever the exposed smaller frame, the button 298 is pressed, which advances the film a full frame plus the distance from the edge 308 of the smaller frame size, as indicated in FIGURE 8. When the rear edge of the film reaches the cutting groove 158, reference holes 142 actuate the sensors 262, stopping the film and energizing the cutting mechanism 154. When the exposed frame is severed, the film strip is driven in a reverse direction until the sensors 262 are again actuated, arresting the film strip with its severed end in registration with the edge 308 of the film window, ready for another exposure.

It will be apparent to those skilled in the art, that, while a preferred embodiment of the invention has been described, many modifications and embodiments may be made without departing from the spirit and scope of the invention.

I claim:
1. An X-ray film transport device comprising:
   a housing having an X-ray window;
   a film advancing means in said housing that is drivingly engageable with an X-ray film to advance the film forwardly past said X-ray window;
   means in said housing, located in advance of said X-ray windows, for making a reference mark on the film;
   a sensing means in said housing located at said X-ray window adapted to respond to a reference mark on the film, said sensing means being in alignment with and spaced a predetermined distance from said marking means in a direction longitudinally of the film, said distance corresponding to a desired length of film frame;
   means for initiating operation of said film advancing means to move the film between said marking means and said sensing means to bring a mark on the film into operative association with said sensing means; and means, initiated by a reference mark and said sensing means coming into operative association, to arrest said film advancing means and further travel of the film with a desired length of film frame in registration with said X-ray window.

2. An X-ray film transport device as in claim 1 in which:
said device includes means for initiating actuation of said marking means,
said means for initiating operation of said film advancing means being adapted to respond to actuation of said marking means to start said film advancing means after a mark has been made on the film.

3. An X-ray film transport device as in claim 1 in which:
said marking means comprises a punch for forming a reference hole along an edge of the film, and
said sensing means includes a member normally contacting a surface of the film as the film passes said sensing means and adapted to enter a reference hole to initiate operation of said means to arrest said film advancing means and further advance of the film.

4. An X-ray film transport device as in claim 1 in which:
a platen is mounted in said housing at a place for exposing a frame of the film and is adapted for movement into and out of a film holding position,
said film transport device having power means to move said platen into and out of said film holding position.

5. An X-ray film transport device as in claim 4 in which:
said platen is normally biased into said film holding position and is adapted to be moved out of said film holding position by actuation of said power means,
said power means being adapted to be actuated in response to actuation of said means for initiating operation of said film advancing means.

6. An X-ray film transport device as in claim 4 in which:
said platen is normally biased into said film holding position and is adapted to move out of said film holding position upon actuation of said power means,
said power means being adapted to be de-energized to permit movement of said platen to film holding position in response to actuation of said sensing means by a reference mark on the film.

7. An X-ray film transport device as in claim 1 in which:
a platen is mounted in said housing in a position for exposing a frame of the film, and
in which a film cutting means is mounted in said housing in a position to receive the film after exposure on said platen,
said sensing means being located in a position to arrest further travel of the film when an edge of an exposed frame of the film is in operative alignment with said cutting means.

8. An X-ray film transport device as in claim 1 in which:
a platen is mounted in said housing in a position for exposing a frame of the film, and
in which said film transport device has a plurality of said sensing means spaced apart in a direction longitudinally of the film for distances proportional to the differences between different film frame sizes,
each of said sensing devices being electrically associated with said means to arrest said film advancing means,
each of said sensing means being located in a position to arrest travel of the film when the area of one size of frame of the film is superimposed on said platen,
said device having electrical means for selectively connecting one only of said sensing means to said means to arrest said film advancing means.

9. An X-ray film transport device as set forth in claim 1 in which:
a platen is mounted in said housing in a position for exposing a frame of the film, and
a film cutting means is mounted in said housing in a position to receive the film after exposure on said platen, and
in which said device has a pair of said sensing means, the first of said sensing means being located in a position to arrest travel of the film when the area of a frame of the film is superimposed on said platen,
the second of said sensing means being located in a position to arrest further travel of the film when an edge of an exposed frame of the film is in operative alignment with said cutting means,
said device having electrical means for selectively connecting one only of said sensing means to said means to arrest said film advancing means.

10. An X-ray film transport device as set forth in claim 9 in which:
said film advancing means is reversible to move the film in reverse as well as in forward direction over said platen,
said device has a means operatively associated with said second sensing means and said cutting means to actuate said cutting means through a cutting cycle when the film is caused to be arrested by said second sensing means,
said device also having a means operatively associated with said cutting means to initiate reverse movement of said film advancing means in response to completion of a cycle of said cutting means and to operatively connect said first sensing means to said means to arrest said film advancing means.

11. An X-ray film transport device comprising:
a housing having an X-ray window in one wall;
a platen mounted in said housing opposite said window for movement between film holding and film clearing positions;
a feed roller means mounted adjacent a film entrance end of said housing for advancing a strip of film forwardly for passage between said X-ray window and said platen;
a film edge marking means mounted in said film entrance end of said housing and adapted to make a reference mark along an edge of the film;
a sensor device positioned adjacent an edge of said platen in alignment with said film marking means for contact with a mark on an edge of the film when the film is advanced over said platen, said sensor device being spaced from said marking means, in a direction longitudinally of the film, a distance corresponding to a desired length of film frame;
means to actuate said marking means;
means to actuate said feed roller means; and
means responsive to contact between said sensor device and a reference mark on the film to deactivate said feed roller means and to effect movement of said platen to film holding position with a desired length of film frame in registration with said X-ray window.

12. An X-ray film transport device as set forth in claim 11 that includes:
a film threading mechanism positioned and arranged in said housing for advancing the film into said feed roller means and including opposed threading rollers;
means normally maintaining said threading rollers spaced apart sufficiently to pass the leader of the film therebetween with clearance;
selectively actuatable powered means connected to at least one of said threading rollers for bringing said threading rollers into contacting, driving engagement with opposite sides of the film; and
a member mounted in said housing on the opposite side of said feed roller means from said threading rollers and in the path of movement of film advanced by said feed roller means, said member being adapted to yield to contact with an end of the film and being operatively associated with said powered means to de-energize said powered means upon yielding to release said threading rollers from contact with the film.

13. An X-ray film transport device as set forth in claim 12 in which:
said threading rollers comprise first and second sets of rollers arranged in opposed pairs at opposite edges of the film;
said first set of rollers being drivingly interconnected to said feed roller means for concurrent actuation;
said second set of rollers being mounted for movement towards and away from said first set of rollers and being normally biased away from said first set of rollers;
said powered means including a solenoid adapted to move said second set of rollers towards said first set of rollers when said solenoid is energized;
said yieldable member being operatively associated with a circuit including said solenoid to open said circuit upon yielding of said member.

14. An X-ray film transport device as set forth in claim 11, that includes:
a film cutting device mounted in said housing at the opposite end of said platen from said feed roller means;
powered means to actuate said cutting means through a cutting cycle;
a second sensor device positioned adjacent an edge of said platen in alignment with said film marking means for contact with a mark on an edge of the film when the film is advanced over said platen, said second sensor device being positioned for said contact to occur upon an edge of a frame of film coming into operative registration with said cutting device,
both said first and second sensor devices being electrically arranged in a circuit with said means for de-activating said feed roller means; and
a means for electrically connecting a selected one only of said first and second sensor devices to said means for deactivating said feed roller means.

15. An X-ray film transport device as set forth in claim 14 in which:
said cutting device comprises a cutting bar arranged to extend transversely of the film and a cutting wheel carried on an endless chain for movement in cutting opposition to said bar to slice the film, said cutting wheel having bearing support on a rigid track that slidably mounts a carriage carrying said cutting wheel.

16. An X-ray film transport device as set forth in claim 14 in which:
said cutting device includes a carriage member mounting a cutter and mounted for movement in an endless path, and
in which a pair of switches are mounted in said housing in the path of movement of said carriage to be contacted thereby after said cutting device has severed the film,
the first of said switches being adapted for de-activating said powered means to actuate said cutting device, and
the second of said switches being adatped for energizing a means to initiate actuation of said feed roller means in a film reverse movement direction.

17. An X-ray film transport device as set forth in claim 11 that includes:
a film cutting device mounted in said housing at the opposite end of said platen from said feed roller means,
said housing being formed with a film exit slot positioned to receive film passing from said platen and past said cutting device;
a take-up film canister detachably connected to said housing and formed with a slot adapted to be positioned in registration with said film exit slot of said housing; and
means in said housing and on said canister for closing said exit slot and said canister slot simultaneously with removal of said canister from said housing.

18. An X-ray film transport device as set forth in claim 11 in which:
said film marking means comprises a punch mechanism for forming a hole in the film, and
in which said sensor device comprises an elongated resilient member supported at one end on a contact board, said platen being formed with an aperture through which the other end of said resilient member protrudes to be biased against a surface of the film passing over said platen,
said contact board mounting a contact pin adjacent said resilient member positioned and arranged to provide clearance between said contact pin and said resilient member when said resilient member engages the film surface, said resilient member upon entry into a reference hole punched in the film coming into contact with said contact pin,
said contact pin being operatively associated with said means to de-activate said feed roller means.

References Cited

UNITED STATES PATENTS 2,872,585  2/1959  Kallenburg et al. _____ 250—66
3,244,084  4/1966  Davis _____ 250—49.5 X RALPH G. NILSON, Primary Examiner A. L. BIRCH, Assistant Examiner